UNITED STATES PATENT OFFICE.

FRANK H. PLATT, OF BROOKLYN, NEW YORK.

COMPOSITION OF MATTER.

SPECIFICATION forming part of Letters Patent No. 684,091, dated October 8, 1901.

Application filed February 6, 1901. Serial No. 46,249. (No specimens.)

*To all whom it may concern:*

Be it known that I, FRANK H. PLATT, a citizen of the United States, residing in the city of New York, borough of Brooklyn, and State of New York, have invented certain new and useful Improvements in Compositions of Matter, of which the following is a full, clear, and exact description.

My invention relates to a composition of matter which is intended to be used in making building-blocks for partitions, for pipe-coverings, fire-boards, and the like, and the object has been to produce a composition suitable for the above uses which will be cheap, light in weight, fire, water, and sound proof, and generally non-conductive.

My mixture is composed, essentially, of calcined gypsum and wood fiber in about equal proportions, by bulk, or about five parts of gypsum to one part of wood fiber, by weight. When these ingredients are thoroughly mixed and become set, they produce a substance which partakes of the characteristics of both wood and artificial stone. I also found it advisable to add to suitable portions of the above ingredients a small quantity of alum or a small quantity of alum and salt.

In preparing this composition I take, preferably, about the following proportions: calcined gypsum, one thousand pounds; wood fiber, two hundred pounds; alum, one pound; salt, one pound. The alum and salt may be dissolved in a quantity of water sufficient when added to the gypsum to reduce it to a thin paste and the fiber should then be added to this mixture and thoroughly intermixed by a mechanical mixer or otherwise.

I am aware that plaster and cements of all kinds have been used with a fibrous substance, such as hair, wool, asbestos, and even wood fiber; but in every case the fiber has been merely a binding material for holding the substances together, while in my mixture the fiber constitutes a material part of the product and gives to it qualities which are not found in the other substances and which it would not otherwise possess.

My material is tenacious and solid, but at the same time light in weight and possesses many of the desirable qualities of both wood and adamantine structures. Nails and screws hold well in it, and it does not crack, although smooth plaster-like surfaces can be obtained. Cement and plaster also readily adhere to it, and it is an exceedingly good non-conductor of heat. The function of the alum in this composition is twofold—it tends to make the gypsum set more quickly, and, furthermore, adds materially to the coherence of the fiber particles and gypsum. The salt acts as an additional accelerator. A small quantity of whiting can also be introduced with advantage, giving an added smoothness and finish to the product.

I do not intend to confine myself to the proportions specified, as they may be varied within reasonable limits without altering the principle of my invention.

Having thus described my invention, what I claim, and desire to secure by Letters Patent, is—

1. A composition of matter consisting of calcined gypsum, wood fiber, in substantially equal portions by bulk together with a small quantity of alum and salt, substantially as described.

2. A composition of matter consisting of calcined gypsum, wood fiber, in substantially equal portions by bulk together with a small quantity of alum, substantially as described.

3. A composition of matter contisting of substantially equal parts by bulk of calcined gypsum and wood fiber, substantially as described.

4. A composition of matter consisting of calcined gypsum, wood fiber, in substantially equal portions by bulk together with a small quantity of alum and whiting, substantially as described.

5. A composition of matter consisting of calcined gypsum and wood fiber, in substantially equal portions by bulk together with a small quantity of alum whiting and salt, substantially as described.

In testimony whereof I have hereunto signed my name in the presence of two subscribing witnesses.

FRANK H. PLATT.

Witnesses:
M. DUNN,
ROBERT VALENTINE MATHEWS.